United States Patent [19]

Ivanov et al.

[11] 3,928,778

[45] Dec. 23, 1975

[54] DEVICE FOR THE PRECISION DISPLACEMENT OF AN ARTICLE WITHIN A PLANE

[76] Inventors: Evgeny Alexandrovich Ivanov, Berezovaya alleya, 3, kv. 65; Vladislava Venediktovna Silchenkova, korpus 214, kv. 24; Alexandr Afanasievich Sazonov, ploschad Junosti 4, kv. 48; Nikolai Stefanovich Budkin, korpus 117, kv. 4, all of Moscow, U.S.S.R.

[22] Filed: June 21, 1974

[21] Appl. No.: 481,846

[30] Foreign Application Priority Data
June 26, 1973 U.S.S.R. ............................ 1936988

[52] U.S. Cl. .................... 310/8.3; 310/8.5; 310/9.1
[51] Int. Cl.² ........................................ H01L 41/08
[58] Field of Search .......... 310/8, 8.1, 8.3, 8.5, 8.6, 310/9.1, 26; 318/116, 118, 135

[56] References Cited
UNITED STATES PATENTS

| 3,138,749 | 6/1964 | Stibitz | 318/135 |
| 3,835,338 | 9/1974 | Martin | 310/8.6 |

*Primary Examiner*—Mark O. Budd
*Attorney, Agent, or Firm*—Holman & Stern

[57] ABSTRACT

A device for the precision displacement of an article within a plane in which two piezoelectric plates are arranged in one plane, each plane being connected, with its end, to a coordinate table by means of a corresponding flat spring, with its other end being rigidly secured onto a platform, and a piezoelectric plate for turning the coordinate table within the plane, with the latter plate being connected to the platform by means of a screw pair.

1 Claim, 1 Drawing Figure

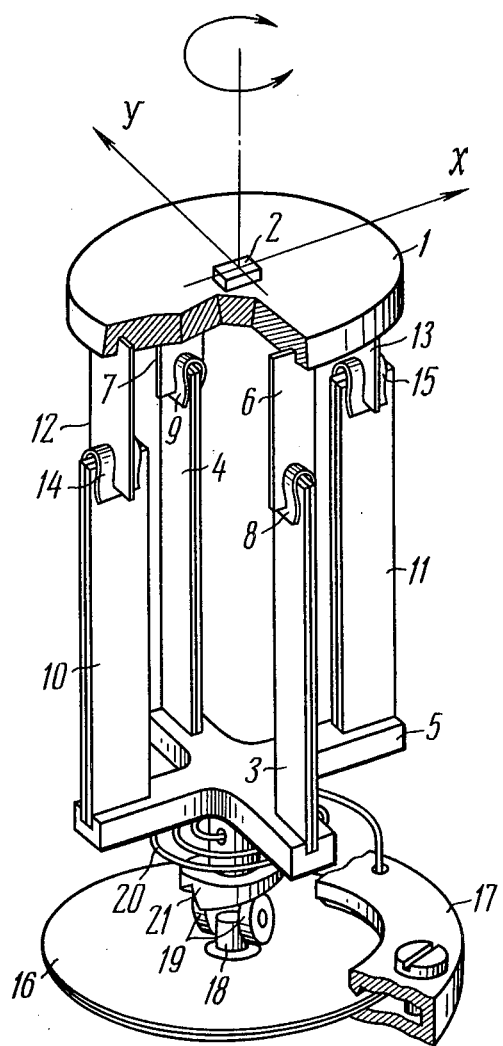

DEVICE FOR THE PRECISION DISPLACEMENT OF AN ARTICLE WITHIN A PLANE

FIELD OF THE INVENTION

The invention relates to microelectronics and more particularly to a device for the precision displacement of articles within a plane, which finds application in operational units for orienting the elements of integrated circuits, in coordinate-measuring devices and in optic instruments.

BACKGROUND OF THE INVENTION

Known in the art are devices for the precision displacement of articles in a plane, provided with a piezoelectric electromechanical transducer.

In one of the known devices for the precision displacement of articles in a plane, the coordinate table is coupled with a piezoelectric electromechanical transducer in which there are two vertical and one horizontal props defined by piezoceramic disks as well as two supports defined by elastic material.

A disadvantage of this known device for the precision displacement of articles in a plane is the complexity of the design due to the provision of a multi-layer coordinate table and a great number of piezoceramic disks and the involved complexity of the precision working of the piezoceramic disks.

Another disadvantage of this known device is the provision of the elastic supports featuring residual elastic strain affecting the longevity of the device as well as the accuracy and dependability of its operation.

Also known is another device for the precision displacement of articles in a plane, comprising a coordinate table coupled with the platform and capable of travel with the aid of a piezoelectric electromechanical transducer equipped with piezoelectric plates, with each plate being mechanically connected, by means of a stop, with a carriage proper that carries the coordinate table along one of the coordinates.

A disadvantage of this known device for the precision displacement of articles in a plane is the complexity of the design due to the provision of a large number of accessory traveling members (carriages) and the of rigid springs connecting the carriages one to another, which affects the accuracy and quick-action and reduces the limits of travel of the coordinate table.

OBJECT AND SUMMARY OF THE INVENTION

An object of the invention is to provide a device for the precision displacement of articles in a plane, in which the design of the piezoelectric electromechanical transducer helps simplify the construction of the device as a whole and raises the accuracy and quick-action and extends the limits of the coordinate table travel.

The essence of the invention is that the present device for the precision displacement of articles in a plane comprises a ring base, a platform, and a coordinate table which is connected with said platform with a capability of travel assisted by a piezoelectric electromechanical transducer equipped with piezoelectric plates designed to help move said article along the coordinates and turn the coordinate table in the plane, and that, according to the invention, two piezoelectric plates serving to help move said article along one coordinate are arranged in one plane, two piezoelectric plates serving for moving articles along the other coordinate are arranged also in one plane perpendicular to the plane of the first two plates, with each piezoelectric plate being connected, with one of its ends, to the coordinate table by means of a flat spring perpendicular to the plane of this piezoelectric plate and, with its other end, being secured on the platform, while the piezoelectric plate serving for turning the coordinate table in the plane is secured in the ring base and connected with said platform by means of a screw pair.

BRIEF DESCRIPTION OF THE DRAWINGS

The invention will be more apparent from the description of an exemplary embodiment and an appended drawing in which the sole FIGURE shows in perspective and partly broken away a device for the precision displacement of articles in a plane, according to the invention.

DETAILED DESCRIPTION OF THE INVENTION

A device for the precision displacement of articles in a plane comprises a coordinate table 1 accomodating an article 2 being displaced. Piezoelectric plates 3 and 4 are made rectangular, arranged in one plane and serve for moving the coordinate table 1 with the article 2 thereon along the coordinate X. One end of each of these plates 3 and 4 is rigidly secured in the grooves of a platform 5, while their other ends are connected, with the aid of flat springs 6 and 7 whose planes are perpendicular to the planes of the plates 3 and 4, to the coordinate table 1. One end of each of the flat springs 6 and 7 is secured in the grooves of the coordinate table 1 and its other end is connected, with the aid of hinges 8 and 9, to the plates 3 and 4 corresponding to the springs 6 and 7.

Piezoelectric plates 10 and 11 are also made rectangular, arranged in one plane perpendicular to the plane of the plates 3 and 4 and serve for the displacement of the coordinate table 1 with the article 2 thereon along the coordinate Y.

One end of each of these plates 10 and 11 is rigidly secured in the grooves of the platform 5, while the other ends are connected to the coordinate table 1 by means of flat springs 12 and 13 whose planes are perpendicular to the plane of the plates 10 and 11, with one end of either flat springs 12 and 13 being rigidly secured in the grooves of the coordinate table 1 and the other end being connected, by means of hinges 14 and 15, to the plates 10 and 11 corresponding to the springs 12 and 13.

The piezoelectric plates 3,4,10, and 11 are bimorph piezoceramic plates.

A piezoelectric plate 16 serving for rotating the coordinate table 1 in a plane is also made as a bimorph piezoceramic disk secured rigidly in a ring base 17. Provided in the center of the plate 16 is a pusher 18 with two bearings 19. The pusher 18 is compressed by a spring 20 to a double-thread screw cam 21 integral with the platform 5. The pusher 18 and the screw cam 21 constitute a screw pair.

The piezoelectric plates 3,4,10,11, and 16 together with the screw pair provide a piezoelectric electromechanical transducer.

The device for the precision displacement of articles in the plane, according to the invention, operates in the following way:

As a result of the supply of control voltage across the plates 3 and 4 from a source (not shown in the drawing), the plates will tend to deflect in keeping with a converse piezoelectric effect, with maximum deflection being in the hinges 8 and 9.

The displacement of the upper ends of the plates 3 and 4 is transferred, through the hinges 8 and 9 and the flat springs 6 and 7 arranged to receive the force with their ribs and therefore not deformable, to the coordinate table 1 movable, in turn, along the coordinate X.

The flat springs 12 and 13 would, in this instance deflect unimpeded along the coordinate X, since the force developed by the plates 3 and 4 is directed perpendicular to the plane of the springs 12 and 13.

The length of the displacement of the coordinate table 1 along the coordinate X is proportional to the amplitude of the control voltage applied, while the direction of the dispalcement depends on the polarity of this voltage.

In case the control voltage is supplied across the plates 10 and 11, the device operates in a similar way thus permitting the displacement of the coordinate table along the coordinate Y.

If control voltage is supplied across the plates 3,4,10, and 11 simultaneously, the coordinate table moves in a resultant direction governed by both coordinates X and Y.

Whenever the coordinate table 1 is, to rotate in a plane, a control voltage is supplied across the plate 16 which sags (is displaced) to its maximum in the center thus pushing the screw cam 21. The turn of the screw cam 21 effects a turn of the platform 5 together with the coordinate table 1. An angle of elevation of the screw line of the cam 21 is selected on condition of the absence of self-braking.

The size of a turn angle of the coordinate table 1 is proportional to the amplitude of the applied control voltage, while the direction of the turn depends on the voltage polarity.

Usable instead of bimorph piezoceramic plates 3,4,10, 11, and 16 are any piezoelements strong in bending.

The simple design of the device for the precision displacement of articles in a plane and the absence of accessory moving elements and elastic supports help extend the sphere of its application.

In addition to the application of the microelectronics for the precision displacement of elements of integrated circuits, substrates and tools in assembly equipment and process instrumentation, the present device can be applied in optic and mechanical equipment, lasers, coordinate-measuring and other units requiring precision displacement of articles, ranging from splits of a micron to several millimeters.

Articles being displaced are both elements of integrated circuits, substrates and silicon plates as well as mirrors for deflecting light and laser beams and other pieces.

What we claim is:

1. A device for the precision orientation of articles in a plane, comprising: a ring base; a platform; a coordinate table for accommodating an article being oriented; and a piezoelectric electromechanical transducer assembly operatively connecting said platform to said coordinate table, said piezoelectric electromechanical transducer assembly comprising a plurality of piezoelectric plates, each plate having first and second ends, first of said piezoelectric plates being arranged in one plane and displacable along one coordinate for moving an article along the one coordinate, second of said piezoelectric plates being arranged in a plane perpendicular to said one plane of the first of the plates and displacable along a second coordinate for moving said article along the second coordinate, flat springs, each corresponding to each of said piezoelectric plates and connecting the first end of the corresponding piezoelectric plate with said coordinate table, the plane of said flat springs each being perpendicular to said corresponding piezoelectric plates; and a third piezoelectric plate, said third piezoelectric plate being connected to said ring base, a screw pair coupling said third plate with said platform, said second ends of said piezoelectric plates being rigidly secured to said platform.

* * * * *